Sept. 1, 1953  A. HOWARD ET AL  2,650,753
TURBOMACHINE STATOR CASING
Filed June 11, 1947  4 Sheets-Sheet 2

Inventors:
Alan Howard,
Chester S. Rice,
Bruce O. Buckland,
by Prowell S. Mack
Their Attorney.

Sept. 1, 1953  A. HOWARD ET AL  2,650,753
TURBOMACHINE STATOR CASING
Filed June 11, 1947  4 Sheets-Sheet 4

Inventors:
Alan Howard,
Chester S. Rice,
Bruce O. Buckland,
by *Prowell S. Mack*
Their Attorney.

Patented Sept. 1, 1953

2,650,753

UNITED STATES PATENT OFFICE 2,650,753

TURBOMACHINE STATOR CASING

Alan Howard, Bruce O. Buckland, and Chester S. Rice, Schenectady, N. Y., assignors to General Electric Company, a corporation of New York Application June 11, 1947, Serial No. 754,002

2 Claims. (Cl. 230—133)

This invention relates to gas turbine power-plants, particularly to one of the "simple" or "open cycle" type, consisting of a single compressor, combustion system, and turbine arranged with the compressor direct connected to the turbine.

In the design of gas turbine power plants, a major consideration is the provision of arrangements for permitting free differential thermal expansion of heated parts without producing undesirable deformation of the rotor or stator or material alteration of the clearances between the rotor and various stationary parts. Because of the extremely high temperatures to which certain parts must necessarily be subjected, it is necessary to use special high temperature resisting materials, such as various stainless steels. These generally have a coefficient of expansion in the neighborhood of twice that of ordinary mild steel, with the result that utilization of such materials magnifies the problems resulting from differential thermal expansion. Furthermore, in a power plant designed for applications where the load must be frequently and materially altered, as for instance in marine installations and locomotives, it is found that differential thermal expansion problems are intensified still further by differences in the size and mass of various related parts and differences in the resistance of the heat flow paths to them from the source of heat, with accompanying differences in the rate of change of dimension when temperatures change rapidly.

An object of the invention claimed herein is to provide an improved turbo-machine casing structure particularly suited for a compact integral gas turbine power plant, adapted for mobile applications, as in ships and locomotives.

Another object is to provide a novel stator casing arrangement for an axial flow compressor of substantial axial length, specially constructed to prevent distortion of the casing due to differential thermal expansion or forces imposed on the casing when the power plant is used in mobile installations.

A further object is to provide a stator casing arrangement for a gas turbine power plant which is sufficiently rigid that the power plant may be mounted by means of a three-point suspension in a marine craft or locomotive without the necessity of a rigid exterior frame or bed for the plant, the stator casing constituting a portion of the "main frame" of the plant.

A still further object is to provide an improved axial flow compressor for a power plant of the type described, having a stator casing specially arranged to provide such rigidity that the compressor may be supported in "overhung" relation to the rest of the power plant.

Other objects and advantages will be apparent from the following description taken in connection with the accompanying drawings, in which.

Certain features of the compressor rotor structure are described in a divisional application of A. Howard and C. S. Rice, Serial No. 79,766, filed March 5, 1949, now abandoned. Certain features of the turbine nozzle and bucket wheel shroud structure are disclosed in U. S. Patent 2,606,741 issued August 12, 1952, on a divisional application of Alan Howard, Serial No. 107,306, filed July 28, 1949. An improved form of the combustion chamber described herein is disclosed in the U. S. Patent 2,547,619, issued April 3, 1951, on a continuation-in-part application of B. O. Buckland, Serial No. 62,333, filed November 27, 1948. Certain features of the rotor shaft structure are disclosed in a copending divisional application of B. O. Buckland and C. S. Rice, Serial No. 208,961, filed February 1, 1951. Certain features of the supporting arrangement for the power plant are disclosed in U. S. Patent 2,632,997, issued March 31, 1953, on the divisional application of A. Howard and B. O. Buckland, Serial No. 208,962, filed February 1, 1951. Certain features of the air-cooled turbine frame structure are covered in the U. S. Patent 2,591,399, issued April 1, 1952, on a divisional application of B. O. Buckland and A. Howard, Serial No. 206,966, filed January 20, 1951. All of the above-identified applications are assigned to the same assignee as the present application.

*Main frame and casing structure*

Figures 1, 4, 5:
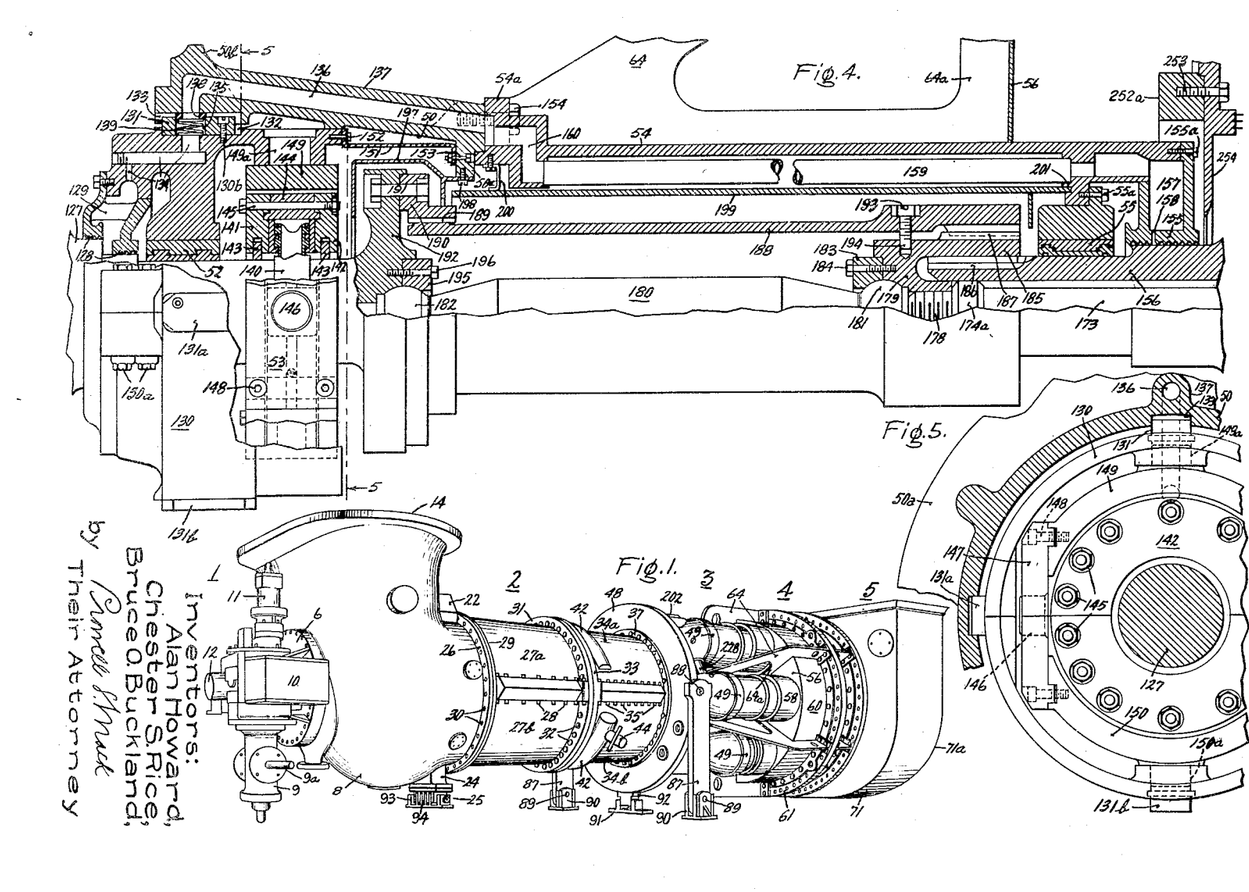
Fig. 1 is a perspective view of the exterior of a complete gas turbine power plant in accordance with the invention.
Fig. 4 is an enlarged sectional view of the bearing and rotor coupling assembly as shown in a smaller scale in Fig. 3.
Fig. 5 is a sectional view of the thrust bearing arrangement taken on the plane 5—5 in Fig. 4.

Referring more particularly to Fig. 1, the power plant includes an accessory assembly indicated generally at 1, an axial flow compressor indicated generally at 2, a combustion system indicated generally at 3, a turbine assembly at 4, and an exhaust casing at 5.

Figures 2, 2A, 2B:
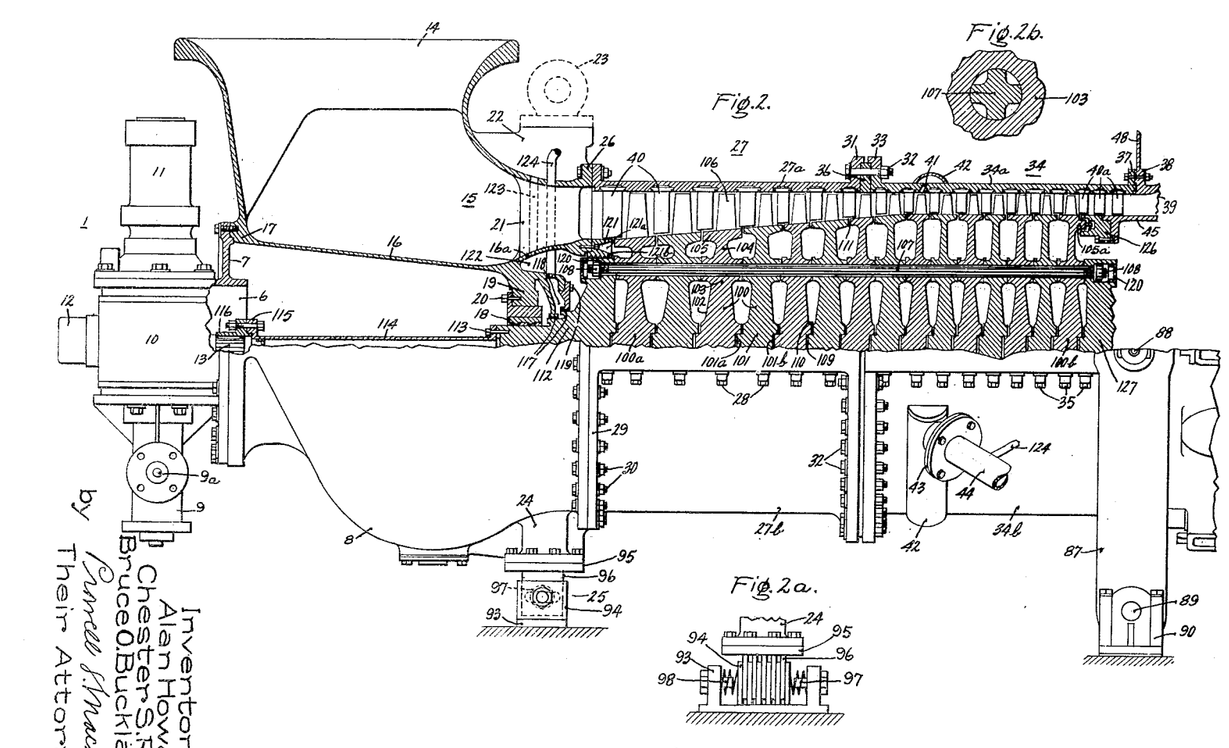
Fig. 2 is a view partly in section of the compressor and accessory section of the power plant.
Fig. 2a is a detail view of a vibration damping member for the compressor end of the power plant.
Fig. 2b is a sectional view of a detail of the compressor.

As may be seen best in Figs. 1 and 2, the accessory section 1 includes a casing 6 having a flange 7 adapted to be bolted to the exterior end of the compressor inlet casing 8. The accessory casing 6 supports a plurality of powerplant accessories, such as for instance a fuel pump 9, a fuel regulator 10, a speed governor 11, and a tachometer generator 12. These accessories are secured by suitable bolting flanges in circumferentially spaced arrangement around the accessory casing, and are adapted to be driven by suitable gearing (not shown) contained within the casing and provided with a single power input shaft 13 adapted to be driven from the compressor rotor through coupling means described hereinafter.

Referring now to Fig. 2, it will be seen that the compressor inlet casing 8 forms an inlet opening 14 communicating with the annular compressor inlet passage 15. The inner wall of passage 15 is formed by the substantially cylindrical wall 16 terminating at the exterior end in the bolting flange 17 to which is secured the accessory casing flange 7. The interior end of cylindrical wall 16 is cast integral with the support ring 19 which carries the first journal bearing 18. Journal bearing 18 may be of a conventional Babbitt-lined type, and may be secured by suitable threaded fastenings 20 to the casing portion 19. Extending across the compressor inlet passage 15 are a plurality of circumferentially spaced vanes 21 formed integral with the outer wall of casing 8 and with the inner wall 16a, which latter is a continuation of the cylinder 16 and forms the inner boundary of the compressor inlet passage.

Formed integral with the top outer wall of the casing 8 is a boss 22 to which may be secured a lifting eye, shown in dotted lines at 23, for handling the compressor or the complete powerplant. At the bottom of casing 8 is a second boss 24 adapted to be connected to a vibration damping fixture 25, the construction and purpose of which will be seen hereinafter.

The right-hand or compressor end of inlet casing 8 is provided with a continuous annular flange 26, to which is bolted the first section 27 of the compressor stator casing. Stator section 27 is not a continuous annular member, but is divided along axial planes into two or more portions bolted together. As shown in Figs. 1 and 2, the section 27 is formed of a top casing section 27a and a bottom section 27b secured together by bolts 28 at the horizontal plane through the axis of the machine. When secured together by bolts 28, the two sections 27a and 27b present a continuous annular bolting flange 29, which is secured by bolts 30 to the continuous annular flange 26 of the compressor inlet casing. By reason of the fact that the sections 27a, 27b are thus firmly secured to the continuous flange 26, the inlet end of the compressor stator is caused to preserve its true circular shape regardless of temperature changes which may occur during the operation of the machine. At the opposite end of the section 27, the two halves are provided with portions forming a flange 31, which is secured by bolts 32 to a cooperating flange 33 formed on the second compressor stator section 34. Like section 27, stator section 34 is also formed of an upper half 34a and a lower half 34b secured together at the horizontal plane by bolts 35.

As may be seen clearly in Fig. 2, the intermediate stator section flanges 31, 33 do not contact each other directly but are formed with a cylindrical rabbet in which is located a continuous ring member 36. The bolts 32 pass through flanges 31, 33 and the solid ring 36. This arrangement insures that the mid-portion of the compressor stator will be caused to maintain its true circular shape regardless of thermal or stress distortions produced by the operating conditions.

At the compressor discharge end, stator sections 34a, 34b are provided with a bolting flange 37 adapted to be secured to a cooperating flange 38 formed on the intermediate main frame casing indicated generally at 39. This casing 39 is an integral unit, so that the flange 38 is a continuous solid ring.

From the above it will be seen that the inlet end of stator section 27 is held rigidly to its true circular shape by being bolted securely to the flange 26 of inlet casing 8; the discharge end of stator section 34 is securely held to its true circular shape by being securely bolted to the continuous flange 38 of the intermediate casing 39; while the mid-portion of the compressor stator is held accurately to shape by the interposed continuous ring member 36. This arrangement insures that the compressor stator casing will not be distorted regardless of extreme temperature gradients which may be encountered in service, or due to the weight of the compressor inlet and accessory casings when the compressor is supported in overhung relation, as described hereinafter.

The compressor stator sections 27, 34 are provided with fifteen circumferential rows of stationary compressor blades 40, which may be secured in circumferential grooves in the stator sections by means of suitable dove-tail portions formed on the blade bases. The details of the means for holding the blades in the stator sections is not material to an understanding of the present invention and therefore is not further described here.

Between the ninth and tenth stage blades, each of the stator casings, 34a, 34b, is provided with a plurality of circumferentially spaced ports 41 adapted to discharge air under pressure into a manifold 42. Each of the two separate manifolds 42 is provided with an outlet flange 43 to which may be connected a suitable conduit 44 from which air may be drawn for various purposes, some of which are indicated hereinafter.

At its discharge end, stator section 34 is provided with three circumferential rows of turning vanes 40a, which are arranged to divert the compressor discharge air into a uniform axially directed flow.

Figures 3, 3A, 3B, 3C:
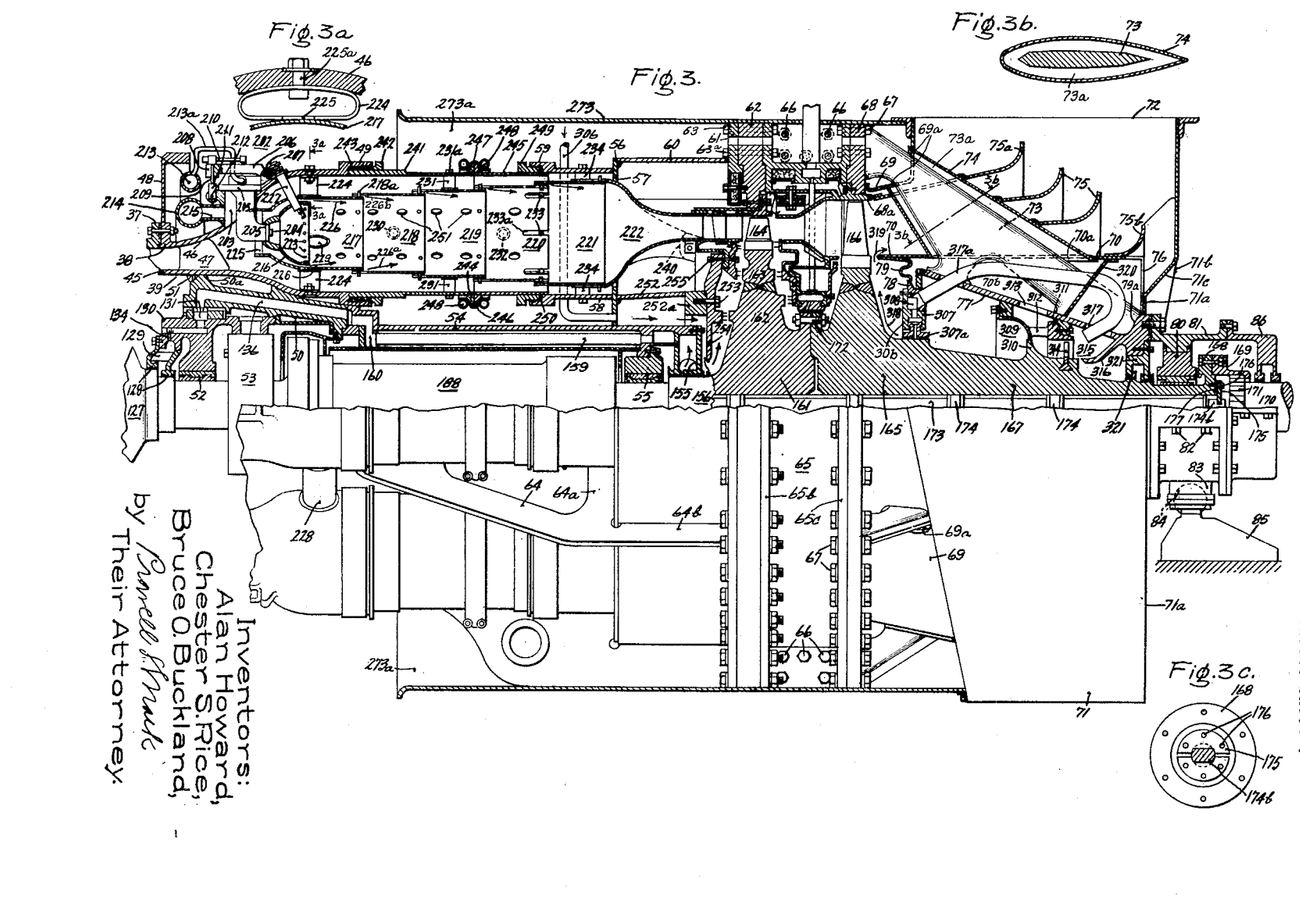
Fig. 3 is a view partly in section of the combustion system and turbine assembly of the power plant.
Fig. 3a is a view of one support means for the inner liner of the combustor, taken on the plane 3a—3a in Fig. 3.
Fig. 3b is a sectional view of a detail of one of the supports for the exhaust end bearing.
Fig. 3c is a detail view of the means for locking the turbine rotor securing stud.

Referring now to Fig. 3, the intermediate casing 39 serves a number of purposes. An inner annular wall 45 and an outer wall 46 cooperate to form the annular compressor discharge passage across which pass 6 radial circumferentially spaced struts 47. Secured to the bolting flange 38 of outer wall 46 is a radially extending flange 48 which serves as a principal supporting member for the powerplant, as described more particularly hereinafter.

The annular walls 45, 46 form a diffusing transition section communicating with a plurality of circumferentially spaced circular flanges 49 each adapted to support one end of the outer housing of a combustor, as described more particularly hereinafter. While any suitable number may be used, in the present case there are six combustors arranged circumferentially around the axis of the powerplant. As will be described more particularly in connection with the combustor, the intermediate casing 39 also serves to support fuel nozzle 205, there being one such nozzle for each combustor.

Cast integral with, or fabricated separately and welded into the casing 39 is a substantially cylindrical but somewhat tapering frame member 50. Frame member 50 has a flange 50a secured to wall 45 by a circumferential weld 51. Thus the flow of heat from the combustion system to the member 50 and the bearings supported thereby is reduced to a minimum. At one end member 50 serves to support a second journal bearing 52, also a thrust bearing assembly 53, in a manner described more particularly hereinafter in connection with Fig. 4.

At its right-hand end member 50 is secured to another cylindrical frame member 54, at the other end of which is supported a third journal bearing 55. Welded to the cylindrical frame member 54, in the neighborhood of the journal bearing 55, is a radially extending annular plate 56, which has a circumferential row of openings 57 around each of which is welded one end of a short cylinder 58 having at the other end a flange 59 adapted to support the turbine end of the outer combustor casing. To the outer circumference of transverse plate 56 is welded a cylinder 60 which entirely surrounds the transition end of the combustion system, as may be seen in Fig. 1. At its other end cylinder 60 is welded to a continuous ring 61, to which is secured a main frame ring 62 by a plurality of threaded fastenings 63, in a manner which will be more apparent from Figs. 6 and 7.

While the transverse plate 56 and axially extending cylinder 60 help to support the frame ring 61 from the cylinder 54, a principal portion of the support between these members is provided by a plurality of circumferentially spaced diagonally extending ribs or struts 64, there being one strut between each pair of adjacent combustors. At the left-hand radially inner end, each strut 64 is welded to the left-hand end of the frame cylinder 54, in a manner which will be apparent from a comparison of Figs. 1, 3, and 4. At an intermediate portion, the strut 64 is provided with an inwardly extending portion 64a welded to the plate 56 and the frame cylinder 54 respectively. At its radially outer end, the strut is provided with an axially extending portion 64b welded to the outer surface of cylinder 60 and the adjacent face of frame ring 61. Thus it will be seen that members 56, 60, and 64 provide an extremely rigid frame for supporting the ring 61 from the inner cylindrical frame member 54.

Secured to the main frame ring 62 by the bolts 63 is an interstage turbine casing indicated generally at 65 in Fig. 3. This casing is not an integral annular member, but is formed in two halves divided along a vertical plane through the axis of the turbine and secured together by a plurality of threaded fastenings 66. At its downstream side, interstage casing 65 is provided with a second radially extending flange secured by bolts 67 to a second integral main frame ring 68. Welded to the exterior face of ring 68, adjacent the inner periphery thereof, is an exhaust casing fabricated of comparatively thin, flexible sheets and having a somewhat conical external wall 69, a cylindrical inner wall 70, and a discharge scroll 71 with a flanged outlet opening 72. Discharge scroll 71 is provided with a flat end wall plate 71a which extends upwardly to approximately the center-line of the powerplant and then flares outwardly somewhat as indicated at 71b in Fig. 3. Plate 71a is normal to the axis of the powerplant and is connected with the outwardly flaring portion 71b by a central dished portion 71c.

Projecting diagonally across the annular passage defined by exhaust casing walls 69, 70, are a plurality of circumferentially spaced, radially and axially extending struts or ribs 73. It is convenient to use six of these struts, the same number as there are of the struts 64. At the radially outer end, each strut 73 is secured, as by bolting or welding, to the main frame ring 68. Each strut projects through an opening 69a in the outer exhaust casing wall 69 and through a second opening 70a in the inner exhaust casing wall 70. Surrounding each strut 73 in spaced relation thereto, is a cooling air shroud 74 which projects through the respective openings 69a, 70a, and is welded to the peripheries thereof. These shrouds 74 form a cooling air path surrounding each strut 73, as described more particularly hereinafter, and also serve to support the inner exhaust casing wall 70 from the outer casing wall 69. Welded to the shrouds 74 and arranged within the turbine exhaust passage are a plurality of guide vanes 75 adapted to direct the turbine discharge fluid smoothly outward into the exhaust scroll 71. The outermost vane 75a extends all the way to the vicinity of the main frame ring 68 and is sealed thereto by means which will be pointed out more particularly in connection with Fig. 6. Thus it will be seen that member 75a forms the outer wall of the passage for the turbine discharge fluid. The innermost guide vane 75b is secured to the outer circumference of the cylindrical wall 70. The walls 70 and 71a are provided with openings at 76, which openings form a discharge port for cooling air as described hereinafter. As will be apparent from Fig. 3, the turning vane 75b forms one wall of this cooling air outlet.

At their radially inner ends, the struts 73 are welded to an integral conical frame member 77. At its outer end adjacent the last stage turbine bucket wheel, frame member 77 is provided with an inwardly extending flange portion 78 which is connected by a convoluted annular flexible member 79 to the adjacent edge of the inner casing wall 70. At its exterior end, the conical frame member 77 is provided with a heavy flange member 79a to which is secured the housing 81 of exhaust end journal bearing 80. Bearing housing 81 is for convenience split into two halves along a horizontal plane and secured together by the threaded fastenings 82. The lower half of housing 81 is provided with a projecting boss 83 which forms a socket for receiving a ball member 84 secured to an end support pedestal 85. It will be understood that the ball support arrangement 83, 84, 85 provides one support point for the powerplant which is fixed in three dimensions. The end of bearing housing 81 is closed by a cap member 86, which may also be formed in two halves bolted together at the horizontal center-line. Also secured to the flange member 79a of frame member 77 is a labyrinth casing 321 provided with seal members for preventing the flow of oil vapor from bearing 80 to the left into the cooling air passages described hereinafter.

Reference is now made to Fig. 1 for an illustration of the other main support means for the complete powerplant. This comprises a pair of vertical transversely spaced struts 87, which at their upper ends are pivoted at 88 to diametrically opposite points on the main frame ring 48. At their lower ends, struts 87 are carried in pivots 89, held in U-shaped fixtures 90 suitably secured to the bed of the powerplant. A fourth point of constraint is provided by a U-shaped fixture 91 secured to the powerplant bed and defining a space into which projects a lug 92 secured to the lowermost point of the support flange 43. As will be obvious from Fig. 1, the block 92 has parallel flat side surfaces free to slide either longitudinally or vertically in the channel fitting 91 but adapted to resist transverse displacement relative to the fitting 91.

From the above it will be seen that the complete powerplant is carried at three points, one of which (ball 84) is fixed in space relative to the bed of the machine, two of which (pivots 89) are completely free to move longitudinally and transversely but are constrained in a vertical direction, while a fourth point (lug 92) is free to move either vertically or longitudinally but is adapted to prevent transverse displacement. Thus there is provided for the powerplant a mounting arrangement which is extremely simple mechanically yet furnishes adequate support while permitting appreciable longitudinal expansion of the powerplant as its temperature changes. The arrangement is particularly intended for supporting a gas turbine powerplant on a portable bed such as the frame of a locomotive, which is not completely rigid but subject during operation to certain transverse, longitudinal, and torsional loads which cause some flexure of the powerplant bed. With this improved mounting arrangement, such distortions may occur in the bed of the powerplant without transmitting excessive stresses to the main frame and casing assembly of the powerplant.

It will be seen that the above-described support for the powerplant leaves the compressor and accessories casing supported in overhung relation relative to the flange 48. Because of the weight of these, and the considerable axial length of the compressor, there may be some tendency for this overhung portion to vibrate when the powerplant is installed in a locomotive, due to rotor unbalance and other causes. To prevent such vibration, a suitable vibration damping device 25 may be provided to cooperate with the boss 24 on the compressor inlet casing, as shown in Figs. 1 and 2. The details of one such vibration damping device may be seen in Fig. 2a. A channel shaped member 93 is secured to the bed of the powerplant and has welded thereto a plurality of spaced friction plates 94. Bolted to the boss 24 is a second member 95 carrying a cooperating set of parallel plates 96. These friction plates are interleaved in a manner obvious from Fig. 2a and are adapted to be biased together into frictional engagement with each other by means of suitable spring means, for instance coil springs 97 interposed between the channel member 93 and the end friction plates. Springs 97 may be supported on suitable pins 98 secured in channel member 93 and projecting through the springs, but terminating short of the first friction plate. The comparatively thin friction plates 94, 96 are sufficiently flexible as to be deflected laterally by the springs 97 into frictional engagement with each other. The friction force thus produced is sufficient to dampen any vertical vibration of the compressor inlet casing 8 but is not great enough to prevent longitudinal displacement of the compressor casing under the influence of temperature changes.

While one form of vibration dampening device has been illustrated, it will be obvious that many other known equivalent mechanical or hydraulic vibration damping devices may be likewise employed.

Having now described the main casing and frame structure of the powerplant with the support means for it, it is desired to direct attention very strongly to the fact that the entire structure is designed throughout to maintain the casing and frame members at a comparatively low temperature, so that ordinary, inexpensive, easily worked, and readily available materials may be used for the frame and casing members. The use of mild steel for the principal frame members results in the further very great advantage that differential thermal expansion is reduced by reason of its lower coefficient of thermal expansion, as compared with high temperature alloys such as stainless steel. Certain of the design features which bring about this desirable result have already been pointed out. For instance, the frame member 50 of the intermediate casing 39 is supported only by the flange 50a welded to the inner compressor discharge passage wall 45 so that a minimum flow path area is provided for the conduction of heat from the compressor discharge to the bearing support assembly. Likewise, the cylindrical frame member 54 and the diagonal struts 64 are separated by substantial spaces from adjacent hot parts. An air-cooling arrangement for the struts 64, main frame rings 62, 63, and the other series of struts 73, will be described more particularly hereinafter.

Rotor structure

The complete rotor assembly for the powerplant includes the axial flow compressor rotor, turbine rotor, a main coupling assembly for securing the turbine rotor and compressor rotor in driving relation, second coupling means for connecting the inlet end of the compressor rotor to the accessory drive shaft, third coupling means for connecting the exhaust end of the turbine rotor to a load output device, first and second journal bearings supporting the compressor rotor, third and fourth journal bearings supporting the turbine rotor, a thrust bearing assembly intermediate the second journal bearing and the main coupling assembly, and various bearing seals and rotor cooling arrangements.

The axial flow compressor rotor is somewhat of a "hybrid," intermediate the well-known "drum type" and the equally well-known "disk type" of turbomachine rotor. Like the drum type, it has no central shaft extending entirely through the rotor; yet it is like the disk type in that it is built up of separately fabricated disk members, each carrying a circumferential row of moving blades. The construction of the separate disks and their relation to each other is illustrated clearly in Fig. 2. The design of the separate disks is quite similar, except that the initial disks are comparatively wide in axial direction in order to support the comparatively wider compressor blades adjacent the inlet, being also of a smaller outside diameter because of the greater radial height of the blades adjacent the inlet. The tip diameter of the blades is kept constant throughout the length of the compressor and the outside diameter of the compressor disks is increased as the blade height decreases with increased density of the fluid going through the compressor.

Each disk member 100 consists of a central hub portion 101, a first radially extending web portion 102, a circumferential flange or boss section 103, a second radially extending web portion 104 and a rim portion 105 to which the circumferential row of moving blades 106 is secured, by any suitable means. The details of the blade fastening arrangement are not necessary to an understanding of the present invention and therefore are not illustrated further. The hub portion 101 has a cylindrical boss 101a projecting axially at one side and a similar cylindrical recess 101b at the other side.

Projecting axially through the annular flange section 103 are a plurality of a circumferentially spaced through-bolts 107. The shank of these bolts is not of complete circular section but is irregular in outline, and may have a cross-section shape as illustrated in Fig. 2b. The ends of the "arms" of the cross-shaped shank are shaped to exactly fit the inner surface of the bolt holes through the annular bosses 103 so that the bolts are accurately located and restrained against movement outward under the influence of centrifugal force at high speed. The purpose of making the cross section of the bolt of such an irregular outline is to reduce the net cross-section area of the bolt shank so as to be equal to or somewhat less than the root area of the threads engaged by the nuts 108 provided at either end of the bolts 107. This arrangement is necessitated by the fact that during assembly the through-bolts are drawn up sufficiently tight that the shanks stretch an amount on the order of .09 inch in about 55 inches total length, in order to secure the disk members together sufficiently rigidly. By reducing the cross-section area of the shanks 107, the desired stretching will occur in the shank without failure of the threads.

As will be seen in Fig. 2, the rabbet fit provided between adjacent disks by the bosses 101a and the recesses 101b provides for accurate centering of the disks relative to each other and also takes any shear stresses which occur between adjacent disks. On the other hand, all compressive stress between adjacent disks is taken on the side faces of the annular bolting bosses 103. To insure this, there is axial clearance between each pair of adjacent disks at the locations indicated by numerals 109, 110, and 111. The clearance space at 111 between adjacent rim portions is particularly important for it prevents frictional rubbing between adjacent disks which might occur by reason of vibration caused by the blades or set up in the disk itself, or by bending stresses imposed on the rotor. Such frictional rubbing between adjacent disks would be extremely serious if it occurred, for it may quickly result in a temperature rise sufficient to distort the rotor, destroy the required operating clearances between the rotor and stator blades, and may even result in complete destruction of the compressor. By providing the clearance space 111, of such magnitude that differential thermal expansion will never produce a complete closing of this clearance space, such disastrous effects can be avoided. The clearance spaces 111 also prevent "bowing" distortion of the rotor in the event that any stator blade tips rub on the rotor. Such rubbing, if it occurs, will rapidly heat the rotor; but the spaces 111 permit the rotor disk rim portions to expand axially without distortion of the rotor.

It will be seen that this improved rotor structure provides an arrangement in which the moving blades are carried on separately fabricated disk members which are easy to manufacture and assemble and are so designed that shear stresses are taken at the hub portion, compressive stresses are taken on an annular bolting flange intermediate the hub and rim portion, and frictional heating by rubbing of adjacent rim portions is avoided.

The initial blade-carrying disk 100a forms a rabbeted fit at its hub portion with the adjacent face of a rotor end member 112, which serves a number of functions. Secured to the extreme end of member 112, as for instance by a plurality of threaded fastenings 113, is a flanged torque tube 114 which has at its opposite end a flanged coupling 115 provided with an internally splined member 116 engaging an external spline formed on the end of the accessory drive shaft 13. Thus the accessories mounted on casing 6 are caused to be driven by the torque tube 114 when the compressor rotor turns. The end portion of member 112 forms a journal supported in the first bearing 18. Adjacent bearing 18, the member 112 is provided with annular shoulders cooperating with a two-part labyrinth seal 117 separated by an intermediate chamber 118 formed in the bearing support member 19. For convenience in manufacture, the labyrinth seal members 117 may be formed separately and secured to the ring member 19, as for instance by the bolts 119.

As will be apparent in Fig. 2, the nuts 108 secure the rotor end member 112 to the compressor disk assembly. In order to reduce "windage losses," it is desirable to provide the recesses in which the nuts 108 are located with a suitable cap 120, which may be pressed, threaded, or otherwise secured in the recess. The extreme outer circumference of rotor end member 112 provides an annular surface cooperating with a labyrinth seal member 121, which for manufacturing convenience may be fabricated separately and secured by suitable threaded fastenings to the adjacent end of compressor inlet casing wall 16a.

It will be observed that the adjacent rim of the first disk 100a forms a rather close clearance with the labyrinth seal member 121. It has been found that rotation of the compressor rotor at high speed produces a strong vortex whirl of the air in this clearance space 121a which results in a radial pressure gradient tending to induce flow of fluid through labyrinth seal at 121b. This increases the tendency for lubricating oil vapor from the bearing 18 to be drawn through the labyrinth seal 117, through the seal 121b, and out through the clearance space 121a into the compressor flow path. When this occurs, the compressor blades quickly become fouled with oil and dirt, with the result that the compressor efficiency falls off sharply. For instance, dirty compressor blades have been found to decrease the compressor efficiency as much as 5 to 10%. To avoid this trouble, the space 122 intermediate the labyrinth seals 117, 121b, is vented to the atmosphere through a passage 123 provided in the inner compressor casing wall 16a, rib 21, and the outer compressor casing wall. With this venting arrangement, the vortex action produced in the clearance space 121a merely draws in atmospheric air through the vent 123, instead of drawing oil vapor through the labyrinth seal 117.

To further resist the leakage of lubricating oil from bearing 18 into the compressor flow path, a known arrangement of pressurizing is provided for the two-part labyrinth seal 117. This includes an air conduit 124 adapted to take air under pressure from the manifold 44 associated with the bleed manifolds 42. Conduit 124 projects through the hollow rib 21, through the compressor casing wall 16a and communicates with the space 118, as shown in Fig. 2. With this arrangement, the positive pressure created in space 118 causes air to flow to the left through labyrinth seal 117 toward the bearing, while another portion of the air from space 118 flows to the right through seal 117 into the space 122. This flow of air from the space 118 towards the bearing 18 effectively resists the flow of lubricating oil or oil vapor in the opposite direction.

At the discharge end of the compressor, the last blade-carrying disk 100b has an axially extending rim portion 105a adapted to cooperate with a labyrinth seal member 126 so as to prevent leakage of high pressure fluid from the compressor flow path radially inward. This last blade-carrying disk engages, with a rabbet fit, a discharge rotor end member 127, which is secured to the disk assembly by the nuts 108 housed in a recess closed by cap 120, as described in connection with the inlet end rotor member 112. As will be seen in Fig. 3, member 127 forms a journal for the second bearing 52, also stepped shoulders cooperating with a two-part labyrinth seal 128. Intermediate the axially spaced portions of seal 128 is a chamber 129 which is pressurized in a manner which will be described in connection with Fig. 4. This pressurizing arrangement prevents the leakage of oil vapor from bearing 52 leftward into the compressor chamber in the same manner as described in connection with labyrinth seal 117.

The rather complex bearing and coupling assembly housed within the intermediate casing 39 may be seen better in the enlarged detail view of Fig. 4. Here it may be seen that the conical main frame member 50 supports an inner bearing casing 130. This casing is not an integral unit but is formed in two halves split on a horizontal plane and secured together by bolts 130a. This divided casing provides the supporting means for the labyrinth seal 128 and the journal bearing 52, in a manner which will be apparent from Fig. 4.

Bearing casing 130 is supported coaxially in the frame member 50 by means of three or more longitudinal key members one of which is shown at 131 in Fig. 4, and may be seen partly in elevation in Fig. 5, which is taken on the irregular plane 5—5 in Fig. 4. Key 131 is seated on a longitudinal groove 132 in the outer circumference of casing 130 and may be secured by a machine screw 130b. Key 131 also projects radially outward and into a cooperating groove 133 in casing 50. As may be seen in Fig. 5, the parallel side surfaces of key 131 snugly engage the cooperating surfaces of groove 133. With three or more circumferentially spaced keys 131a, 131b, etc., the inner bearing casing 130 will be supported exactly coaxial with the frame cylinder 50, regardless of any differential expansion between the frame member 50 and the bearing casing 130. With these keys forming the support for the bearing casing 130, the heat flow path to the bearings is made of very high resistance.

Air for pressurizing the labyrinth seal 128, is supplied through a succession of drilled passages 134 in casing 130. Aligned with the exterior end of passage 134 is a hole 135 projecting radially through the key 131. A cooperating passage 136 formed in a projecting ridge 137 at one location on the circumference of casing 50, supplies air under pressure to the passage defined by recesses 135, 134. In order to seal the space between key 131 and recess 133 at the place where pressurizing air from conduit 136 enters the hole 135, an annular packing washer 138 is provided. This packing washer is slidably seated in the recess 135 in key 131 and is biased radially outward into contact with the adjoining face of recess 133 by means of a coil spring 139 seated in the recess 135, as shown in Fig. 4. Since bearing casing 130 is split while frame member 50 is an integral ring, it is necessary in assembly to bolt the two halves of casing 130 together, assemble the keys in their respective recesses and then slide the whole assembly axially into place in frame member 50. During this process the spring biased washer 138 may be depressed so as to be flush with the outer surface of key 131. Casing 130 with its keys 131 is then slid axially into frame member 50, whereupon spring 139 biases washer 138 radially outward to perform the sealing function mentioned above.

Inner bearing casing 130 also serves to support the thrust bearing assembly indicated generally at 53. The rotor assembly is positioned axially, and the axial thrust loads are taken by, a thrust flange 140 formed integral with an intermediate portion of rotor end member 127. Cooperating with opposite faces of flange 140 are Babbitt-lined thrust bearing members 141, 142. These members are not continuous rings but are divided along a horizontal plane through the axis of the rotor, as may be seen in Fig. 5. Each of the members 141, 142 is provided with a seal in the form of a segmental ring 143 located in an annular groove with close clearances between the ring and the sides of the groove but appreciable radial clearance between ring and groove. The inner periphery of ring 143 engages shaft 127 with a fit which permits free sliding but has a clearance sufficiently small to substantially prevent oil leakage therethrough. Thrust bearing members 141, 142 form a rabbet fit with an intermediate spacer member 144. Members 141, 142, and 144 are held together by a circumferential row of bolts 145, as may be seen in Figs. 4 and 5.

While the thrust members 141, 142 are divided along a horizontal plane, as seen in Fig. 5, the intermediate spacer ring 144 is divided into two segments along a vertical plane. Thus when members 141, 142, 144 are clamped together by means of bolts 145, they form an integral assembly surrounding the shaft 127.

To provide the degree of flexibility required of the thrust bearing when the powerplant is used for locomotive application, mounted on a bed of appreciable flexibility, the thrust bearing members are carried by a gimbal mount which provides freely self-aligning support while maintaining the thrust members exactly coaxial with casing 130. This gimbal support includes the following members. Formed integral with the intermediate spacer member 144 are a pair of diametrically opposite gimbal trunnions, one of which is shown in dotted lines at 146 in Fig. 5. These trunnions are pivotally supported in side frame members 147, one of which is also shown in Fig. 5. Side frame member 147 is secured, as by suitable threaded fastenings 148, to the ends of arcuate ring members 149, 150. It will be obvious that members 147, 149, 150 form the "gimbal frame." At their diametrically opposite intermediate portions, segments 149, 150 are provided with trunnions 149a, 150a. These are pivotally supported in bosses projecting inwardly from casing 130, in a manner which will be apparent from Figs. 4 and 5.

As will be apparent from the drawings and the above description of the bearing support arrangement, the casing 130 is somewhat free to slide axially on the radial keys 131 relative to the casing 50. In order to locate these two casings accurately relative to one another, an axially extending locating cylinder 151 is provided, having at one end a flange which is bolted (before casing 130 is inserted into cylinder 50) to casing 130 by means of threaded fastenings 152. After the rotor end member 127, with the bearing casing 130 assembled, is inserted into the casing 50, the other end flange of locating cylinder 151 may be secured to the end flange 50a of casing 50 by means of a plurality of suitable threaded fastenings, such as machine screws 153 which are inserted from the open right-hand end of flange 50a with their heads located in suitable recesses in the flange. It will be apparent that cylinder 151 prevents any longitudinal displacement of the bearing casing 30 relative to the outer casing 50.

The end flange 50a of casing 50 is secured by means of a plurality of threaded fastenings 154 to the end flange 54a of the main cylindrical frame member 54. At its right-hand end, main frame cylinder 54 carries the third journal bearing 55 by means of a plurality of threaded fastenings 55a. Also carried by the right-hand end of cylinder 54 are radially inwardly extending walls forming a labyrinth seal 155 with the turbine rotor end portion 156. The mid-portion of labyrinth seal 155 communicates with annular chamber 157 by means of a plurality of circumferentially spaced passages 158. As will be apparent from Fig. 4, the chamber 157 communicates through a tube 159 with cooperating passages 160 in the left-hand end flange of cylinder member 54, thence with passage 136 in casing 50. The purpose of these passages will be seen hereinafter.

Returning now to Fig. 3, it will be seen that the first stage turbine bucket-wheel, indicated generally at 161, has a hub portion formed integral with a shaft extension 156, a first radially extending web portion 162, to which is welded a circumferential rim portion 163, which in turn carries a circumferential row of buckets 164. These buckets may be secured to rim 163 by any suitable means, such as dove-tails, welding, etc. It will be noted that the buckets 164 are of the "shroudless" or open-ended type. This construction is what has come to be known as a "composite bucket-wheel," which is more fully described and claimed in an application, Serial No. 498,643, filed August 14, 1943, in the name of Alan Howard and assigned to the same assignee as the present application, now Patent 2,432,315, issued December 9, 1947. This construction is characterized by the fact that the central web portion 162 may be readily forged of ordinary mild steel, while the rim portion 163 is fabricated separately of a high temperature resistant material, such as an austenitic steel.

The second-stage turbine bucket-wheel, indicated generally at 165, is also of the composite type and carries a circumferential row of shroudless second-stage buckets 166. Formed integral with bucket-wheel 165 is an axially extending shaft end portion 167 which serves a number of purposes. The end of shaft portion 167 is supported in the fourth journal bearing 80, at the exterior side of which it is provided with a coupling flange 168 to which is bolted an internally splined coupling member 169. The input shaft 170 of a suitable load device (not shown) extends through the bearing end cap 86 and is provided with splines 171 engaging the cooperating splines of coupling member 169.

As will be seen in Fig. 3, bucket-wheels 161, 165 define a cylindrical rabbet fit with each other whereby they are maintained in proper coaxial relation, and are secured together by means of a circumferential row of bolts 172 projecting through cooperating flanges formed integral with the bucket-wheels.

Projecting through a central axial bore in both bucket-wheels 161, 165 is a stud 173 which engages and is held concentric with the bore by means of a plurality of axially spaced circumferential lands 174. At the right-hand or exterior end of the turbine rotor, stud 173 is provided with an end head 174b which is secured to the adjacent face of turbine rotor end portion 167 in the following manner. Head 174b is provided with two diametrically opposite slots in which are located the two halves of a split washer 175. This washer is divided along a diameter, as shown in Fig. 3c, so that the two halves can be assembled in a radial direction into the cooperating slots in head 174b. After being thus assembled, the split washer 175 is secured by suitable threaded fastenings 176 to the adjacent end face of rotor end portion 167, with a shim, or shims, of suitable thickness interposed between, as indicated at 177 in Fig. 3. By proper selection of the thickness of shims 177, the whole turbine rotor including bucket wheels 161, 165 and end portions 156 and 167 may be located axially as desired on the stud 173. This adjustment is required in order to permit proper selection of the clearances between the bucket-wheels and the associated stationary parts described hereinafter. Attention is particularly directed to the fact that this important adjustment can be made very simply from the exterior of the turbine by removing the bearing end cap 86, unfastening the coupling member 169 and sliding it to the right on output shaft 170. Thus the turbine clearances can be adjusted from the exterior of the machine with substantially no disassembly thereof. It will also be observed that the engagement of split washer 175 with the slotted head 174b prevents rotation of stud 173 relative to the rotor after assembly.

Referring now again to Fig. 4, it will be seen that the left-hand or interior end of stud 173 is provided with an end land 174a and a thread 178.

This threaded end portion 178 is adapted to engage the threaded bore of a coupling member 179, which serves a number of purposes. The central portion of member 179 forms a spherical socket for one ball end of a "thrust link" 180. Ball member 181 is held in the socket of member 179 by means of a retaining ring 183 secured by suitable threaded fastenings 184. Extending axially from its outer circumference, member 179 is provided with a cylindrical portion 185 which has both internal splines engaging cooperating splines at 186 on the extreme end of rotor end portion 156, and external splines at 187 engaging internal splines on the end of a "torque-tube" 188. The splined joint 186 is designed with sufficient clearances so that rotor end portion 156 may move axially on stud 173 relative to the end coupling member 179, to a sufficient extent to permit the desired adjustment of the turbine bucket-wheel clearances by means of the shims 177, as described above. At the opposite end, torque-tube 188 is provided with another splined connection 189 with a coupling flange 190, the latter being adapted to be secured by bolts 191 to a coupling flange 192 formed integral with the extreme end of the compressor rotor end member 127. The arrangement of the splines of torque-tube 188 permits it to "float" freely in an axial direction; therefore means are provided for locating it axially. This may be in the form of a threaded member 193 secured in the torque tube 188 and having a cylindrical end portion 194 projecting into a recess in the outer circumference of coupling member 179.

The left-hand end of thrust link 180 is provided with a second ball member 182 which is received in a central recess in the coupling flange 192, and retained in position by means of a ring 195 secured by threaded fastenings 196. Thus it will be seen that torque is transmitted from the turbine rotor to the compressor rotor through the splined joints 186, 187, 189, while the two rotors are accurately positioned axially relative to each other by the rigid thrust link 180, which has a universal ball-and-socket connection with the respective rotors. This arrangement compensates for certain misalignment which may arise between the compressor and turbine rotors in initial assembly, or may be caused by certain deflections in the powerplant casing due to exceptional stresses placed on the frame during operation on a comparatively flexible bed such as the frame of a locomotive. By this provision of the thrust link for accurately locating the rotors relative to each other, and for taking any net thrust which may occur on either the compressor or turbine rotor, it is possible to use only a single thrust bearing, that indicated at 53, as compared with prior art arrangements in which a separate thrust bearing is required for each rotor. By thus eliminating one thrust bearing, a very appreciable saving in bearing power losses is effected. Cost and complexity is likewise reduced by the elimination of the extra thrust bearing with its related lubricating and sealing arrangements.

In order to reduce the power losses due to "windage," the torque-tube 188 and its associated coupling members are surrounded by stationary shields fabricated of sheet metal. These include a first shield 197 surrounding the coupling members 192, 190, and secured by a plurality of bolts 198 to the end flange 50a of casing member 50. A second cylindrical shield 199 is supported at its left-hand end by means of a plurality of radi-ally extending brackets 200 bolted to the end flange 54a of casing 54, and having its right-hand end received in a cylindrical rabbet at 201.

The method of assembly of this rotor system may be briefly outlined as follows. The compressor disks 100 are assembled with the end members 112, 127 and secured together with the through-bolts 107 as described above. The split thrust bearing members 141, 142 and the segmental spacer members 144 may then be assembled in a radial direction into position relative to the thrust flange 140; and the members 141, 142 then are moved axially together so as to engage the rabbet fit with the segments 144. Bolts 145 can then be inserted and the gimbal side plates 147 secured by bolts 148, after which the halves of the split bearing support casing 130 may be assembled in a radial direction so as to engage the trunnions 149a, 150a. This also brings the halves of the journal bearing 52 into engagement with shaft portion 127. After the keys 131 have been assembled, the rotor end portion 127 with the complete bearing casing 130 may be inserted from the left in an axial direction into the casing 50. Threaded fastenings 153 may then be assembled from the open face of flange 50a to secure cylindrical spacer 151 and thereby locate casing 130 relative to casing 50. Thrust link 180 is then secured to flange 192 by the retaining ring 195, and the other ball member 181 secured to coupling member 179 by retaining ring 183. Torque tube 188 may then be assembled in an axial direction from the right so that the splines 187, 189 engage properly. This completes the assembly of the casing 50 and its related parts.

Now the shroud member 199 may be assembled into the casing 54 and secured by the brackets 200. From the right-hand end of casing 54, the journal bearing 55 may be inserted and secured by threaded fastening 55a. Then the labyrinth seal casing 155 may be assembled to the right-hand end of casing 54, and secured by the bolts 155a. The assembled casing 54 is now ready to be moved axially to the left over the torque-tube 188 so that the flanges 50a, 54a may be secured together by the bolts 154.

Having assembled the intermediate casings 50, 54, and 130, the method of assembly of the compressor stator will be apparent. The stator sections 34a, 34b are assembled in a radial direction with the stationary blades carried thereby interposed between the blades of the rotor. The longitudinal flanges may then be secured together by bolts 35 and the complete casing section 34 secured to intermediate casing 39 by the bolts 37. The integral ring 36 may then be passed axially over the rotor buckets into position in its rabbet in flange 33, whereupon the divided stator casing sections 27a, 27b may be assembled in a radial direction, bolted together at 28 and then secured by bolts 32 to the continuous ring 36 and flange 33. The compressor inlet casing 8, with the journal bearing 18 assembled, may then be assembled axially from the left so that rotor end portion 112 projects through the bearing, whereupon bolts 30 may be inserted in flanges 26, 29. The accessory drive torque-tube 114 may be then secured to the end of the compressor rotor by bolts 113, access for this purpose being had through the opening defined by end flange 17. The accessories 9, 10, 11, 12, etc. may be conveniently tested and assembled separately to the accessory drive casing 6; the complete accessory assembly then being secured to flange 17. During this last step, the driving spline on the end of accessory drive shaft 13 slides into the cooperating spline of coupling member 116, no access being required to the previously bolted coupling 115.

The compressor and intermediate bearing assembly is now ready to receive the turbine rotor. First the bucket-wheels 161, 165 are secured together by the bolts 172, then the complete turbine rotor may be inserted from the right so that the interior shaft end portion 156 passes through the labyrinth seal casing 155, the journal bearing 55; and the splined teeth at 186 properly engage the mating teeth on coupling member 185. The stud 173 may now be assembled through the bore of the turbine rotor and rotated so as to be threadedly received in the coupling member 179. The threaded end at 178 is drawn up tight until the end land 174a engages the adjacent end surface of coupling member 179. The split washer 175 is now assembled, serving as a locking device to prevent rotation of thread 178 in member 179. The powerplant is now ready for the assembly of the combustors, outer turbine casing, and exhaust end bearing casing.

*Combustion system*

The arrangement of the six circumferentially spaced combustors may be seen in Fig. 3. As indicated previously, the diffusing transition section formed by the outer wall 46 and the inner wall 45, terminating in the circular flange 49, forms the support for the inlet end of the combustor, while the cylindrical member 58 secured to the transverse plate member 56 and terminating in the coupling flange 59 supports the discharge end of the combustor.

Secured to the outer wall 46 of the transition section is a fuel nozzle assembly indicated generally at 202. The nozzle 205 has a body received in a radial recess 203 formed in the nozzle support boss, and is provided with a nozzle tip 204 adapted to deliver an atomized spray of liquid fuel into the combustion space. The outer end of nozzle is provided with a mounting flange 205 adapted to sealingly engage the outer end surface of the fuel nozzle mounting boss. The nozzle proper is secured in position on the mounting boss by a clamping arrangement including an arm 206 secured at one end to a fixed pivot 207. At the other end, arm 206 is provided with a forked portion 208 adapted to receive the shank of a clamping rod 209. The upper end of rod 209 is provided with a transversely slidable operating handle 210, and at its other end rod 209 is threadedly received in a nut 211, which is in turn fixed to a pivot 212. By turning the rod 209 into the nut 211, by means of the operating handle 210, the mounting flange 205 of the fuel nozzle may be securely clamped against the adjacent end face of the mounting boss. Conversely the fuel nozzle is readily accessible for servicing or replacement by simply rotating the operating handle 210 to loosen the rod 209 sufficiently to permit the latter to rotate to the left about the pivot 212 so as to clear the forked end 208 of arm 211, whereupon the latter may be rotated to the right about pivot 206 and the nozzle 205 freely removed through the recess 203.

A suitable liquid fuel from the pump 9 (Fig. 2) is delivered through a conduit 9a to an annular manifold 213 arranged as shown in Fig. 3 between the main support flange 48 and the fuel nozzle. From manifold 213, fuel is supplied to the respective nozzles 205 by means of short flexible tubes or hoses 213a. It will be obvious that fuel nozzles such as the air atomizing type may also be used. Also arranged adjacent the flange 48 is a second annular conduit 214 connected by short branch pipes 215 to each of the six recesses 203 in the respective nozzle mounting bosses. Conduits 215 and the manifold 214 constitute a high pressure air take-off for providing air for various auxiliary purposes at the full pressure of the compressor discharge. This high pressure air may be used for fuel atomization or any other purpose.

The combustion space proper is defined by an inner liner assembly consisting of an end dome 216 arranged within a first liner section 217, which is supported in telescopic relation with succeeding liner sections 218, 219, 220 and end liner section 221, and a transition section 222.

The end dome 216 is a substantially hemispherical shell made of a temperature resisting sheet metal, such as stainless steel, and having a central portion defining an opening adapted to fit snugly around the nozzle tip 204. The right-hand end of dome 216 is supported by means of a plurality of radially extending pins 223, which may be secured as by welding to the end liner section 217 and project freely through holes in the dome 216. Thus the end dome 216 and the end liner section 217 are coaxially located but may freely expand and contract relative to each other.

The end liner section 217 is in turn supported by a pair of flexible brackets located diametrically opposite and shown in more detail in Fig. 3a. These brackets consist of an elliptical loop 224 of flexible sheet metal having one portion welded at 225 to the outer surface of liner section 217, while a second portion is secured by means of a threaded fastening 225a to the outer wall 46 of the transition section. This resilient suspension likewise permits the end liner section 217 to expand and contract radially relative to the casing walls 45, 46. As may be seen in Fig. 3, the inlet end of liner section 217 forms an air inlet shroud surrounding the end dome 216 and defining therewith an annular air inlet opening 225. The spacing between dome 216 and liner section 217 is such that a comparatively thin layer of cooling and insulating air is directed along the inner surface of liner section 217, as indicated by the arrow 226 so as to keep section 217 cool and prevent the deposition of carbonized fuel particles thereon.

A suitable igniting device, such as the spark-plug 227, is secured to the outer casing wall 46 and projects through a suitable opening therein and through the liner section 217 and end dome 216 in a manner obvious from Fig. 3. The electrodes of the spark-plug define a spark gap so located that it will readily ignite the spray of fuel delivered from nozzle 205.

Interconnecting the respective combustors are a plurality of "cross-ignition tubes" 228 (Fig. 1) which communicate with the combustion spaces by means of ports, one of which is indicated at 229 in Fig. 3. These tubes provide pressure equalizing means for the various combustion spaces, and permit some cross-flow of air between the combustors in the event that some of them ignite before others during the starting cycle. Such a cross-ignition tube arrangement, and the purposes it serves, are described more fully in U. S. Patent 2,432,359 issued December 9, 1947 on an application, Serial No. 525,391, filed March 7, 1944 in the name of Dale D. Streid and assigned to the same assignee as the present application.

A second liner section 218 is provided at its left-hand edge with a plurality of circumferentially spaced axially extending slots through which project a plurality of circumferentially spaced radially extending pins 218a, which may be welded to the outer circumference of the right-hand end portion of liner section 217. This pin-and-slot connection insures that liner sections 217, 218 will be supported coaxially while permitting differential thermal expansion therebetween. Section 218 is of sufficiently larger diameter than section 217 that a narrow radial clearance space is formed between the telescoping end portions, which clearance space serves as an annular nozzle to direct an annular film of cooling and insulating air along the inner surface of liner section 218 in the manner of the arrow 226a. The principal support for the liner section 218 is provided by a pair of diametrically opposite bosses indicated in dotted lines at 230. A similar boss is shown in elevation at 231, serving as a similar support for the next liner section 219. It will be observed that the supporting bosses 230 are spaced 90° angularly from the supporting brackets 224 for the first liner section 217; while the bosses 231 supporting section 219 are again spaced 90° from the bosses 230. Similar bosses 232 support the end liner section 220 and are located in the same axial plane with the bosses 230. These bosses may be welded to the outer circumference of the respective liner sections and secured by a bolt, one of which is represented at 231a, passing through the outer housing member and threadedly engaged in the boss.

It will be readily apparent from Fig. 3 that the right-hand end of liner section 218 forms a pin-and-slot connection with telescoping end portion of section 219, in the manner described in connection with sections 217, 218. Here again there is sufficient clearance between the telescoping end portions that a thin annular film of cooling and insulating air is formed on the inner surface of the next section 219, as indicated by arrow 226b. A similar pin-and-slot connection serves to support section 219 in telescopic relation with liner section 220. Section 220 is also supported from section 221 by means of a pin-and-slot connection; but this differs in that the pins 233 are secured to the outer section 221 and project radially inward through comparatively longer axially extending slots 233a. This permits the section 220 to be slid telescopically into the section 221, for a purpose which will appear hereinafter.

Liner section 221 is supported on bosses 234 and forms at its right-hand end a pin-and-slot connection with the inlet end of the transition section 222. Each transition section 222 projects freely through the opening 57 provided in plate 56, and changes from the circular section which it has at the inlet to the arcuate discharge section indicated at 222a in Fig. 7. These arcuate discharge portions 222a are of such circumferential extent that the six transition sections together form a continuous 360° discharge annulus.

It should be observed that a certain amount of air under pressure finds its way from the cylindrical air supply passages around each combustor liner through the clearance spaces defined between the exterior surfaces of transition sections 222 and the periphery of openings 57 in the transverse support plate 56. The air leaking through these clearance spaces circulates in the annular chamber defined between the outer support cylinder 60 and the inner cylindrical wall 252, thus serving to cool the outer surfaces of transition sections 222. This cooling air may eventually find its way into the main motive fluid flow path through the clearances defined between the transition section discharge nozzle 222a (Fig. 6) and the adjacent cooperating surfaces 256b, 257a of the nozzle ring assembly.

Figure 6:
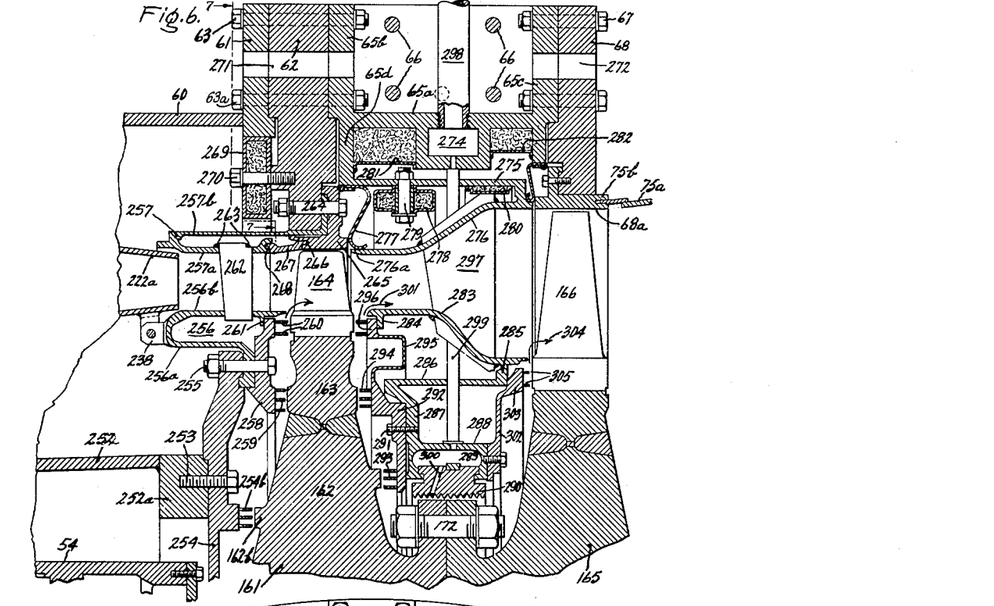
Fig. 6 is an enlarged sectional view of the turbine nozzle structure bucket wheels, interstage diaphragm, and outer turbine casing.
Figure 7:
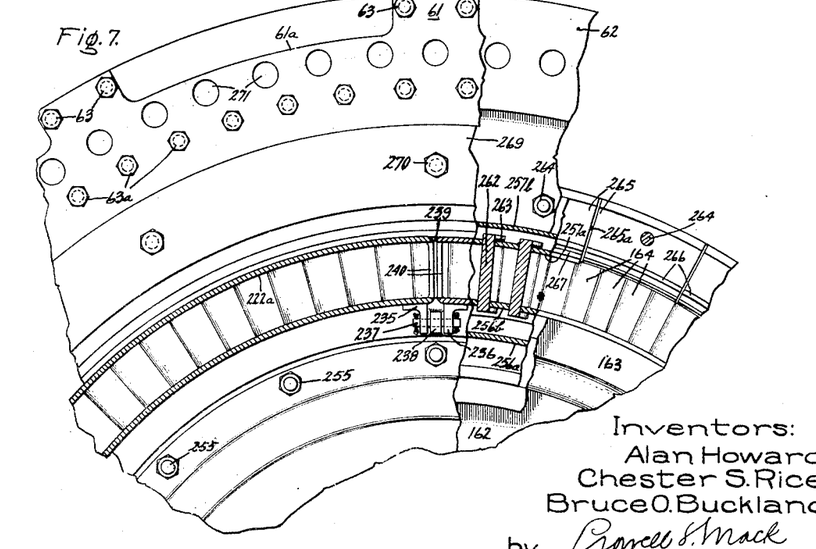
Fig. 7 is a sectional view broken away along the irregular plane 7—7 in Fig. 6.

As shown more clearly in Figs. 6 and 7, the adjacent portions of transition sections 222a are loosely supported relative to each other by angle brackets 235, 236. A round pin 237 projects transversely through the brackets 235, 236 and through a support lug 238 interposed loosely between the brackets and welded to the nozzle ring structure, as shown in Fig. 6 and described more particularly hereinafter. The dimensions of the discharge portions 222a of the transition sections 222 are such that when cold there is a small clearance space at 239 (Fig. 7). When the parts reach operating temperatures, this clearance space 239 substantially closes up. Attention is also directed to the fact that the abutting side walls of sections 222a are cut away somewhat as indicated by the dotted arc 240 in Fig. 3. These cutouts in the side walls of the transition section 222a provide some cross-communication between adjacent transition sections immediately preceding the nozzle ring assembly. This intercommunication helps to equalize the pressure of the motive fluid supplied to the nozzle ring.

Referring now to the outer housing of the combustors, attention is directed to Fig. 3. This housing is composed of two removable sections. The first section 241 is an integral cylindrical member having a left-hand end portion surrounded by a packing gland nut 242. Nut 242 is threadedly received in fixed flange 49 of the outer casing wall 46 and is adapted to compress a packing washer 243 into engagement with the flange 49 and outer surface of cylinder 241 so as to seal the joint against leakage. It will be apparent that liner sections 218, 219 are fixed to this outer housing 241 by means of the lugs 230, 231, respectively. At its right-hand end, outer housing section 241 is provided with a radially extending flange 244 and the second outer housing section 245 is provided at its left-hand end with a cooperating flange 246. To secure flanges 244, 246 firmly together, a "clamp band" assembly is provided as indicated generally at 247. This comprises an annular band split at one or more locations and having an inwardly facing channel portion adapted to surround and engage the flanges 244, 246. Suitable tightening devices, such as a pair of bolts 248 are arranged through lugs at the split ends of band 247 so that by tightening the bolts the band can be caused to firmly engage the flanges. Such clamp band assemblies are well known to those skilled in the mechanical arts and the details need not be further described. At its right-hand end portion, outer housing section 245 is surrounded by a packing gland nut 249 which is threaded into fixed flange 59 and is adapted to compress a packing ring 250.

The method of disassembly of the outer casing and inner liner of the combustor is as follows. First the clamping band 247 is removed and the packing gland nut 249 loosened. Outer casing section 245 may now be slid telescopically into the cylindrical member 58, during which movement the pins 233 slide in the elongated slots 233a. Also the slots at the left-hand side of liner segment 220 are disengaged from the cooperating pins at the right-hand side of section 219. Since liner section 220 is secured to outer casing section 245 by means of the bosses 232, sliding the outer section 245 telescopically into the fixed cylinder 58 automatically carries the liner section 220 into the end liner section 221. Gland nut 242 may now be loosened and the left-hand casing section 241, with liner sections 218, 219, attached, may be moved axially to the right so that the left-hand edge of liner section 218 is disengaged from the pins 218*a*. The dimensions of the cooperating parts are so related that the outer casing section 241, and liner sections 218, 219 may be removed as a unit through the space between the fixed flanges 49, 59.

With casing section 241 and liner sections 218, 219 removed, ample space is provided for access to the inlet liner section 217 with the end dome 216, and at the other end to the discharge end liner sections 220, 221, and the transition section 222. With spark plug 227 and the cross-ignition tubes 228 removed, liner section 217 may be removed by disassembling the bolts holding the brackets 224 to the outer housing walls 45, 46. The manner in which liner section 217 may be slid to the right and removed through the opening provided between flanges 49, 59, will be apparent from Fig. 3. The discharge liner end sections 220, 221, may be removed together by removing the bolts associated with bosses 234 and sliding the two sections together to the left and removing them through the access opening. It will be apparent that during this motion, the pins at the right-hand end of section 221 disengage from the slot at the left-hand edge of transition section 222.

These combustors are of a type which has come to be generally known as the "Nerad combustor," which is disclosed more fully in U. S. Patent 2,601,000 issued June 17, 1952 in the name of Anthony J. Nerad and assigned to the same assignee as the present application. The method of operation of this type of combustor need not be described in detail here, but it may be noted briefly that the combustion air flows from the annular compressor discharge passage defined between walls 45, 46 through the diffusing transition section into the annular air space defined between the inner liner assembly and the outer housing formed by the sections 241, 245, 58. From this annular air supply space, air flows into the combustion space defined within the liner assembly through a number of holes 251, which are arranged in axially spaced circumferential rows with the respective holes in each circumferential row arranged in straight longitudinal rows. There may be six to eight holes in each circumferential row. As shown in Fig. 3, there may be one circumferential row in the initial liner section 217, two rows each in sections 218, 219 and a final row in the end section 220. A certain amount of secondary air may also flow inward through the open portions of the slots 233*a*. In addition to this combustion air, a comparatively smaller amount of cooling and insulating air flows in the manner indicated by the arrows 226, 226*a*, 226*b*, etc., as described above. With this arrangement the entire inner surface of the liner assembly is shielded by a film of comparatively cool flowing air so that the liner walls are cooled and the contact of partly burned fuel particles with the cool liner walls is prevented. Various arrangements may also be provided for forming a film of insulating and cooling fluid along the inner surface of the end dome 216. Such arrangements are disclosed in the aforementioned patent of Anthony J. Nerad, also in U. S. Patent 2,581,999 issued January 8, 1953 on an application, Serial No. 644,888, filed February 1, 1946 in the name of Walter L. Blatz and assigned to the same assignee as the present application. Further description of this feature of the combustor is not essential to an understanding of the present invention.

It will be observed that the combustion air, which completely surrounds the liner assembly, serves to cool the outer housing walls of each combustor so as to reduce the heat radiation losses from the combustors. Furthermore, the comparatively cool outer combustor walls serve as a radiation shield preventing the transfer of heat from the hot inner liners to the main frame members 54, 64, 59, etc., also reducing the flow of heat to the bearing casing 130.

Nozzle and turbine casing structure

Hot motive fluid received from the combustor discharge sections 222 is delivered to the buckets 164 of the first stage wheel 161 by means of a nozzle ring assembly, the details of which will be seen in Fig. 6. This assembly is supported at its inner periphery by means of a heavy flange member 252*a* secured to the end of an axially extending cylinder 252 welded to transverse plate 56 so as to form an integral part of the main frame structure. Secured to flange 252*a* by a plurality of threaded fastenings 253 is an annular nozzle support plate 254. Secured by bolts 255 to the outer circumference of nozzle support plate 254 is a convoluted ring indicated generally at 256 which has an inner portion 256*a* extending axially to the left, an intermediate radially extending portion to which the support lugs 238 are welded, and an outer wall 256*b* extending axially to the right toward the turbine bucket-wheel and forming the inner surface of the nozzle flow path. The outer flow path of the nozzle ring assembly is formed by a second convoluted member 257, including an inner wall 257*a* welded to, or formed integral with, an outer axially extending wall 257*b*. As will be apparent from Fig. 6, the intermediate portion of the convoluted rings 256 and 257 define an annular opening into which freely projects the discharge portions 222*a* of the combustor transition sections 222. It should also be noted that the ring portions 256*a*, 257*b* are comparatively wide in an axial direction and are sufficiently thin to have appreciable flexibility in a radial direction. Because they are thin, they present a minimum flow path for the conduction of heat from the hot nozzle assembly to the related comparatively cooler supporting structures.

The bolts 255 also serve to support a packing ring assembly including an annular plate 258 having at its inner periphery several concentric packing rings 259 projecting axially and forming close clearances with the adjacent rim portion 163 of bucket-wheel 161. At its outer periphery, plate 258 carries additional packing rings 260. The outer periphery of plate 258 also forms a radially slidable joint with an annular flange 261 at the end of wall 256*b*. As noted above, the convoluted ring 256 has appreciable flexibility in a radial direction so that the nozzle may expand and contract readily relative to the support plate 254 and the sealing ring plate 258. To this end a generous radial clearance space is provided between the periphery of plate 258 and the inner circumferential surface of wall 256*b*. The area of contact between flange 261 and the periphery of plate 258 is kept to a minimum so as to reduce the flow of heat by conduction therebetween.

An additional set of sealing rings 254b are secured to the nozzle support plate 254 and cooperate with an axially projecting boss 162b on the adjacent web portion of bucket-wheel 161. The provision of the projecting annular boss 162b has the advantage that in the event of accidental rubbing between packing rings 254b and the bucket-wheel, the boss 162b may be scored without seriously weakening the web of the turbine wheel. As will be understood by those skilled in the art, any small scratch or groove in the surface of a highly stressed rotor constitutes a "stress raiser" which may rapidly lead to failure of the rotor member. A boss such as that shown at 162b effectively prevents weakening of the bucket-wheel web 162 by any grooves cut by the sealing rings 254b.

Secured in the inner and outer nozzle ring walls 256b, 257a are a plurality of radially extending circumferentially spaced nozzle blades 262. These blades project through suitably shaped openings in both the outer wall 257a and the inner wall 256b, but are welded only at the outside of the wall 257a, as indicated at 263. The radially inner ends of blades 262 are free to slide in and out of the slots in wall 256b through which they project. Thus the inner and outer nozzle walls may freely expand and contract relative to each other without imposing buckling stresses on the comparatively thin blades 262. Conversely, the comparatively thin blades 262, which heat more rapidly than the walls 256b, 257a when suddenly subjected to hot motive fluid, may expand and contract freely.

At its right-hand edge, the outer nozzle support ring 257b is provided with a radially extending flange secured by bolts 264 to the inner periphery of the main support ring 62. Also secured by bolts 264 is a shroud member 265. This is not a solid ring but is made up of a plurality of segments, as may be seen better in Fig. 7. Each segment is held by one bolt 264, and is so dimensioned as to form an appreciable clearance space 265a with adjacent segments when cold. At operating temperatures, this clearance space 265a substantially closes up so that together the blocks 265 form a continuous annular shroud for the open-ended or shroudless buckets 164. At the inlet side, each shroud block 265 is provided with a groove shown at 266 in Fig. 6 and adapted to pivotally receive one edge of a bridge member 267. Member 267 is not a continuous annular ring but is also made up of a plurality of segments, each corresponding in circumferential length to that of the segmental shroud blocks 265. At their inlet edges, bridge segments 267 are provided with a second portion adapted to be pivotally received in a groove 268 formed in the adjacent end face of the outer nozzle wall 257a. With this arrangement, the nozzle wall 257a may freely expand and contract radially relative to the comparatively cooler shroud segments 265, during which movement the bridge members 267 rotate slightly while preserving a substantially continuous wall for the flow of fluid from the nozzles to the turbine buckets.

To further minimize the flow of heat from the hot nozzle ring assembly to the comparatively cooler main frame rings 61, 62, suitable heat insulating lagging is provided. This may be in the form of an annular box 269 fabricated of sheet metal and containing suitable insulating material such as asbestos or magnesia. Box 269 may be secured to the main frame ring 62 by means of bolts 270.

In addition to the bolts 63, the main frame rings 61, 62, are clamped together by an inner row of bolts 63a. Intermediate these two circumferential rows of bolts are a plurality of spaced cooling air holes 271 the arrangement of which will be seen in Figs. 6 and 7. It may be noted that main frame plate 61 is cut away or scalloped as indicated at 61a in Fig. 7 so as to provide radially extending projections through which the bolts 63 pass. On the other hand, the main frame ring 62 has a smooth circular outer circumference. The scallops 61a are provided merely for weight saving.

The entire design of this nozzle ring and shroud assembly is carefully arranged to reduce the transfer of heat from the hot parts to the cool frame members 61, 62, etc. It will be observed that the convoluted ring 257 presents a comparatively long path for conduction of heat from the nozzle ring to the support member 62, and this flow path is of high resistance because of the small cross-section area of wall 257b. The heat insulating box 269 also prevents radiation from the hot nozzle ring assembly to the cool rings 61, 62. Care is taken throughout that metal-to-metal contacts between adjacent parts are kept to a minimum so as to limit the conduction of heat. With the arrangement described, the nozzle blades and walls heat very rapidly when subject to hot motive fluid and are maintained continuously at a high temperature, being permitted to freely expand and contract relative to the comparatively cooler adjacent supporting members as the temperature of the motive fluid varies.

When shroudless turbine-buckets, such as those shown at 164, are used, it is essential to the efficiency of the turbine that the radial clearance space between the bucket tips and the adjacent stationary shroud 265 be maintained at a preselected small value, which however may not decrease below a certain minimum value if mechanical interference between buckets and shroud is to be prevented. This problem of maintaining proper bucket-to-shroud clearances becomes almost impossible to solve if both the bucket-wheel and the shroud are caused to change dimensions rapidly, but at differing rates, as the temperature of the motive fluid varies. The present arrangement facilitates the maintenance of proper clearances by the provision of the main frame ring 62 which is carefully cooled and arranged so that its temperature does not vary sufficiently to materially alter its radial dimensions. The shroud segments 265, which are in direct contact with the motive fluid, are permitted to freely expand and contract circumferentially by reason of the clearance spaces 265a as shown in Fig. 7, with the result that the inner diameter of the shroud ring formed by the segments 265 remains substantially constant. Thus the bucket-wheel can be so designed that when it rises to operating temperature, a safe, minimum clearance space between bucket tips and shroud will result.

The details of the interstage turbine casing 65, may also be seen in detail in Fig. 6. As indicated above, the casing 65 is made in two halves bolted together on a vertical plane through the axis of the powerplant. This casing is channel-shaped in cross-section, having a cylindrical wall 65a and radially extending flanges 65b and 65c adapted to be secured by bolts 63 to main frame ring 62 and by bolts 67 to frame ring 68. Ring 68 is provided with a series of circumferentially spaced cooling air holes 272 arranged similarly to the holes 271 in frame ring 62.

As will be seen in Fig. 6, the flanges 65b, 65c of the interstage casing are provided with holes cooperating with the cooling air holes 271, 272. As seen in Fig. 3, the main frame rings 61, 62, 68 and flanges 65b, 65c are closely surrounded by a cylindrical shroud 273 which extends forward from the exhaust scroll casing 71 and forms an annular cooling air inlet 273a around the combustion system. Thus cooling air is caused to flow over the combustors and through the holes in the main frame rings, in a manner described more particularly hereinafter. It will be apparent that other suitable shroud means may be connected to the flanged inlet end of shroud 273 for the purpose of suitably directing cooling air to the inlet 273a.

Projecting radially inward from the casing wall 65a are walls defining an annular cooling air chamber 274. Projecting inwardly as a continuation of flange 65b, is an annular wall 65d which at its inner periphery is secured to an axially extending wall 275. This is of thin section so as to have some flexibility in a radial direction and to provide a minimum flow path for the conduction of heat from the interstage nozzle assembly. At its right-hand edge, ring 275 has an inwardly projecting portion secured to the adjacent edge of the outer wall 276 of the motive fluid flow path. Wall 276 extends axially with its free edge 276a forming a small clearance space with the adjacent faces of shroud segments 265. This clearance space may be conveniently closed by a resilient sheet metal ring, S-shaped in cross-section, as indicated at 277. The radially outer portion of ring 277 may be secured by suitable means, for instance a few tack welds, to the inner circumference of wall 65d. Because of the reverse curvature of ring 277 and the fact that it is fabricated of comparatively light gage sheet metal, it will resiliently seal the space between the wall 276a and shroud segments 265, while permitting relative thermal expansion therebetween.

It will be observed that the comparatively thin flexible walls 275, 276 form a convoluted ring quite similar in arrangement and purpose to the rings 256, 257 of the first-stage nozzle assembly. To further limit the transfer of heat from the hot interstage nozzle assembly to the cooler casing 65, an annular fabricated sheet metal box 278 filled with heat insulating material may be secured by bolts 279 to wall 275. Similar insulation filled spaces are provided by sheet metal rings 280, 281, and 282, which may be secured in place by suitable threaded fastenings or tack welds.

The inner wall of the motive fluid flow path is formed by an annular wall 283, which at its left-hand edge is provided with an inwardly extending flange 284 and at its right-hand edge is provided with a second inwardly extending portion 285. Secured to wall portion 285 is an axially extending wall 286 which is thin enough in section to be somewhat flexible and to present a high resistance heat flow path. Secured to wall 286 is an inwardly extending wall 287 which carries a casing 288 defining an annular cooling air passage 289 and serving to support a labyrinth type packing member 290. As will be obvious from Fig. 6, the labyrinth seal member 290 cooperates with the outer circumference of the bolting flanges through which project the turbine coupling bolts 172. As shown in the drawings, packing member 290 is intended to represent a well-known type of packing, many various forms of which are familiar to those acquainted with the conventional steam turbine art. Secured to wall 287 by bolts 291 is a sealing plate member 292 which supports two sets of packing rings 293, 294 similar in construction and purpose to the rings 254b, 259. Secured to the outer circumference of member 292 is an annular thin-walled reversely curved member 295 having an outer circumferential portion 296. Ring 296 is in slidable engagement with the side wall of flange 284, and forms a radial clearance space with the inner surface of wall 283. Thus the member 295 effectively seals the space within wall 283 while permitting radial thermal expansion of the free left-hand edge of wall 283. Wall 283 and the above-described parts associated with it are supported from the outer flow path wall 276 by means of the radially extending diaphragm blades 297. Because of the comparatively lower temperature of the motive fluid in this interstage passage, blades 297 may be welded both to the outer wall 276 and the inner wall 283 as shown in Fig. 6; alternatively, only the inlet portions of the blades may be welded to the walls 283, 276, the thin discharge portions of the blades being left free to expand without buckling. Bolted to the right-hand side of casing 288 is an outwardly extending annular sealing plate 302 having a circumferential portion 303 carrying packing rings 305 which form a close clearance with the adjacent rim portion of bucket-wheel 165. Ring 303 is in radially slidable sealing engagement with wall portion 285 so that wall portion 285 is completely free to expand and contract radially relative to the casing 288 and related parts.

As also shown in Fig. 6, main frame ring 68 supports a shroud 68a, which is similar in arrangement and function to the segmental shroud 265 associated with the first turbine stage. At the left-hand edge of shroud 68a, the clearance space with nozzle walls 275, 276 is sealed by a flexible S-ring tack-welded to the inner periphery of flange 65c, and similar in construction and function to ring 277. At its right-hand edge, shroud 68a is sealed to the adjacent edge of exhaust casing wall 75a by a thin flexible annular bridge ring 75b, which may be welded to wall 75a and projects freely into a circumferential groove in the adjacent face of the shroud blocks 68a.

While the thin supporting walls 256a, 257b for the nozzle ring assembly and walls 275, 286 of the interstage casing have been described as being "flexible" in the radial direction, it is desired to call attention to the fact that these walls are not perhaps flexible in the ordinary sense of the word. As described above, these walls are of very thin section and considerable axial length, so as to present a high resistance path for the flow of heat by conduction from the hot parts to the comparatively cooler main frame parts. Because of their thin cross section, it appears in the drawings that they would be flexible in a radial direction. However it must be remembered that each of these walls is a continuous annular member, which is comparatively rigid in the sense that if one end of the ring member were held fixed, it would strongly resist any force tending to move the other end portion transversely, in a plane parallel to the first end portion. In other words, these annular wall members are rigid in the sense that they tend to maintain their respective end portions exactly coaxial. However, when one end of these ring members is strongly heated, as by conduction from a hot member to which the ring is connected, there will be a rather steep temperature gradient established along the axial length of the ring, by reason of the high resistance of the heat conduction path. Furthermore the opposite end of the ring, for instance the flanged right-hand end of wall 257b, will be maintained cool by its intimate contact with the comparatively cool supporting member to which it is attached. Accordingly the free end of these thin walled rings tends to expand radially much more than the cooler fixed end of the ring. The ring is "flexible" in the sense that it readily permits this type of differential thermal expansion without creating excessive stresses in the ring or imposing excessive stresses on associated parts. However, as described above, the ring rigidly maintains its end portions coaxial. This is important for it is obviously necessary to keep the nozzle ring assemblies exactly coaxial with the respective bucket-wheels, in order to preserve the thermodynamic efficiency of the turbine and prevent mechanical interferences.

*Air cooling system*

For cooling and sealing the interstage casing assembly, cooling air from the manifolds 42 in Fig. 2 is supplied by means of conduit 298 to the annular chamber 274 in casing 65, thence through a plurality of circumferentially spaced conduits 299, one of which projects radially inward through each of the hollow nozzle blades 297, discharging into the cooling air passage 289. A plurality of circumferentially spaced passages 300 delivers cooling air from chamber 289 to an intermediate portion of the labyrinth seal 290. It will be observed that the point at which passage 300 enters the labyrinth seal is closer to the left-hand side of the seal than to the right-hand side. This is because there is an appreciable pressure drop across the nozzle diaphragm blades 297, which means that the pressure in the space adjacent the web 162 of the first-stage wheel is appreciably higher than that obtaining adjacent the web of the second-stage wheel 165. By causing the cooling air conduit 300 to discharge into the seal closer to the high-pressure side, the flow of cooling air leftward into the space adjacent bucket-wheel 162 can be made substantially equal to the flow which passes from passage 300 to the right into the space adjacent wheel 165.

That cooling air which flows leftward, leaks past the sealing rings 293, 294, producing a cooling effect on the wheel web 162 and rim portion 163. This cooling air is discharged in the manner indicated by arrow 301 into the motive fluid flow path. That cooling air which flows from the passages 300 to the right through labyrinth seal 290 passes radially outward along the adjacent face of bucket-wheel 165 and is discharged in the manner of the arrow 304 into the motive fluid flow path.

It will be seen from the above that comparatively high-pressure air admitted through conduit 298 is caused to cool the labyrinth seal member 290 so that its desirably close clearances with the rotor may be maintained, this air also serving to cool the adjacent faces of both the first and second stage bucket-wheels.

The method of cooling the upstream side of the first-stage wheel 162 may be seen by reference to Fig. 3. Cooling air under pressure from manifolds 42 (Fig. 2) is supplied to conduit 306 which discharges the cooling fluid into the space defined by the transverse frame plate 56, cylinder 252, and the outer surface of the main frame cylinder 54. From this annular chamber, cooling air flows in the direction indicated by the arrows in Fig. 3 radially inward between the nozzle support plate 254 and the labyrinth seal housing 155, thence radially outward along the web 162 of the first-stage wheel past the sealing rings carried by plates 254, 258 and into the motive fluid flow path as indicated by the arrow in Fig. 6.

A second portion of the air supplied through conduit 306 flows to the left through the labyrinth seal 155 and into the chamber 157 (Fig. 4) defined within the labyrinth seal casing 155. Some of this cooling air also flows to the left towards journal bearing 55 so as to resist the leakage of oil from the bearing 55 to the right through labyrinth seal 155. The pressurized air in chamber 157 is supplied through conduit 159 (Fig. 4) through the related passages 160, 136, 134, into the intermediate chamber 129 of the labyrinth seal 128 at the compressor side of journal bearing 52. It will now be apparent that the cooling air supplied through conduit 306 performs the several functions of cooling the first-stage wheel 161, as well as pressurizing both the labyrinth seals 155, 128.

The arrangement for cooling the discharge side of the second-stage wheel 165, may be seen in Fig. 3. It will be observed that the inner wall 70 of the exhaust casing, in combination with the flexible ring 79, the inner frame member 77, and annular baffle 320 define an annular space 70b communicating with the cooling air passages 73a defined between the cooling shrouds 74 and the support struts 73. These air passages are in communication by way of the openings 69a in the exhaust casing with the annular space contained within the cooling air shroud 273. Cooling air is drawn into the shroud inlet 273a, through the cooling air holes 271, 272 in the main frame rings 62, 68 and through the cooling shrouds 74 into the chamber 70b by a cooling fan described more particularly hereinafter.

At the left-hand end of frame member 77 in Fig. 3, the ring 78 carries a casing 307 which supports labyrinth packing member 307a and defines cooling and sealing air passages 308 which furnish cooling fluid to a mid-point of the labyrinth seal 307a.

Bolted to an intermediate portion of frame member 77 is a curved annular shroud 309 which has an inner edge portion forming a close clearance with a radially projecting flange 310 on turbine rotor end portion 167. Also secured to an intermediate portion of member 77 is a second ring member 311 provided with a plurality of circumferentially spaced axially extending guide blades 312. Circumferentially spaced around frame member 77 are a plurality of openings 313 which provide access from the annular chamber 70b to the cooling air fan inlet defined by shroud 309, ring 311 and the guide blades 312. Secured to turbine end rotor portion 167 by any suitable means are a plurality of circumferentially spaced axial flow fan blades 314 having tip portions forming a small radial clearance with the inner circumference of ring 311 and adapted to draw air in through the openings 313 past guide blades 312 and to discharge this cooling air into an annular discharge passage 315 defined by an inwardly projecting wall 316 formed integral with the end ring 79. Adjacent the end ring 79, frame member 77 is provided with a circumferential row of spaced openings 317, through one of which projects the inlet end of an "impact tube" 317a, which is arranged to catch some of the air discharged from fan 314 and deliver it under pressure to the chamber 308 of the labyrinth seal casing 306. This portion of the air is divided at the labyrinth seal 307a, part of it flowing to the left as indicated by the arrow 318 so as to cool the exhaust side of bucket-wheel 165. This wheel cooling air flow is discharged into the main turbine flow path as indicated by the arrow 319. The remaining openings 317 in frame member 77 serve as discharge ports for the cooling air fan 314. To prevent recirculation of cooling air from the discharge ports 317 back into the inlet ports 313, the conical baffle 320 is secured from the frame 77 to the inner surface of exhaust casing wall 70. This baffle directs the air discharged through ports 317 to the outlet opening indicated at 76. Thence the spent cooling fluid is discharged through the passage defined by the curved vane 75b and the wall 71c.

The complete circuit for the cooling air will now be apparent. Fan 314 causes air to be drawn in through the shroud 273 through the openings in main support rings 62, 68, through the cooling shrouds 74 into the space 70b, thence through ports 313, most of the cooling air being discharged through ports 317 and the opening 76 into the exhaust casing where it mixes with the turbine discharge fluid, while a part of the air goes through tube 317a to pressurize the labyrinth seal 307a and cool the wheel as described above.

While it is possible to use high pressure air from the compressor for performing all the turbine wheel cooling functions (as is done for cooling the first-stage wheel and interstage casing assembly), it is to be noted that this high pressure air is "expensive" in terms of power taken from the main rotor to supply it. An improvement in overall thermal efficiency is obtained if the comparatively low pressure air for cooling and sealing the discharge side of the last-stage bucket-wheel is furnished by an axial flow fan such as blower 314.

While the air discharged into the spaces adjacent the bucket-wheel webs serves to cool the turbine rotor, it should also be noted that this air may serve another important function, as follows. In high temperature turbines of the type described, there is at least some tendency for hot motive fluid to leak from the main flow path into the clearance spaces defined between the bucket-wheels and adjacent casing structure. This high temperature leakage flow may cause serious over-heating; but by introducing cooling air in the manner described above, the spaces adjacent the bucket-wheel webs are "pressurized" with comparatively cool air, thereby resisting the tendency of hot fluid to leak into these spaces. In the case of the first stage bucket-wheel 161, the clearances between the bucket-wheel web portions and the respective sealing rings 254b, 259, 260, 293, 294, etc., have such dimensions that the quantity of cooling air flowing through these clearance spaces will be sufficient to provide the cooling effect required for the first stage wheel. Here the amount of cooling fluid required determines the mechanical design of the sealing members, and the flow is sufficient to build up a positive pressure to reduce or prevent any leakage of hot motive fluid into the space adjacent the bucket-wheel web. The same is true of the flow of cooling air into the space adjacent the upstream side of the second stage wheel 165. On the other hand, the pressurizing function is the major consideration in the design of the labyrinth seal 307a and the conduit means for supplying air to the annular space defined by the member 307 adjacent the discharge side of the second stage wheel. Because of the lower temperatures at this portion of the motive fluid flow path, there is less need for coolant fluid; but it is desirable to pressurize this space so as to prevent circulation of hot motive fluid into the space adjacent the wheel.

From the above description of the exhaust casing and the main frame-work with its cooling system, it will be apparent that the exhaust casing is supported at a radially outer circumference adjacent the last stage bucket wheel, where it is secured to the frame ring 68, being also supported at a radially inner circumference axially spaced from the second stage bucket-wheel, where it is supported by baffle 320 from the main frame member 77. Frame member 77 is rigidly supported from the frame ring 68 by the air-cooled struts 73, which framework remains of substantially constant dimensions during operation and the exhaust casing must be free to readily expand and contract relative to this cool frame-work when subjected to the high temperature exhaust fluid. Therefore, the entire exhaust casing, comprising walls 69, 70, 71, 71a, 71b, 71c is fabricated of relatively thin sheets which will readily change dimension and deflect as necessary to compensate for differential thermal expansion between the exhaust casing and the cool supporting framework. This arrangement by which the casing is carried by the frame ring 68 and inner frame member 77 readily permits such differential thermal expansion without disruptive stresses being created in the casing or distortion produced in the main framework.

Thus it will be seen that the fluid flow path is formed by comparatively thin flexible sheets which are free to heat and cool rapidly and to deflect readily under the influence of differential expansion, while the main load-carrying support members are kept cool and out of contact with the hot fluid, and thus are free from distortion and other troubles incident to high-temperature operation.

The construction of the main frame-work, and its special cooling system, as described above, insures that the principal load-carrying members will remain comparatively cool and therefore will not change dimensions materially as operating temperatures vary in the hot parts carried by the frame. Because the temperature of these load-carrying members (struts 64, 73, rings 62, 68, members 77, 54, etc.) is maintained at a comparatively low value, they may all be fabricated of ordinary mild steel, which is cheap, easily obtainable, and readily worked. This has the additional very great advantage of decreasing the changes in the dimensions of the main frame members as operating temperatures change, by reason of the low coefficient of expansion of mild steel as compared with that of the high temperature resistor metals sometimes used, such as the various stainless steels.

The hot parts of the powerplant which do need to be fabricated of stainless steels, such as the inner combustor lines, transition sections 222, nozzle blades 262 and walls 256b, 257a, bridge segments 267, interstage diaphragm blades 297 and walls 283, 276, etc., are all supported from the cooled frame-work by means which permit free differential thermal expansion.

In brief, throughout the design of this powerplant the "load carrying" function has been separated from the "hot fluid conducting" function, the former being performed by frame and casing members which are adapted to remain sufficiently cool that they can be made of ordinary low-temperature metals, while the latter function is performed by parts made of high-temperature metals which are flexibly hung from the cool frame parts. This arrangement greatly simplifies the serious problems of maintaining proper bearing alignment and the clearances required between the various rotor components and associated stator and casing members.

Because of the complexity of the important features of the powerplant described above, details of the lubricating system for the bearings have not been included. As will be understood by those skilled in the art, suitable lubricating and scavenging pumps which may be mounted on the accessory drive casing 6, would be arranged to supply lubricant to the respective bearing surfaces and return spent lubricant from drain chambers arranged adjacent the bearings to a suitable reservoir (not shown). Such lubrication arrangements are well-known in the art, therefore, the conventional system used with this powerplant has not been described in detail.

Likewise the complete arrangement for supplying fuel to the combustors and regulating the supply so as to vary the load output of the powerplant, has not been disclosed. This is covered in a United States Patent No. 2,558,592, issued June 26, 1951, in the names of N. E. Starkey, C. B. Lewis, and M. A. Edwards, and assigned to the same assignee as the present application. It will be apparent to those skilled in the art that many other types of known regulating systems could also be used.

While a preferred form of our powerplant has been described herein, it will be obvious to those skilled in the art that many of the details may be modified in various ways without departing from the invention, and it is intended to cover by the appended claims all such modifications as fall within the true scope of the invention.

What we claim as new and desire to secure by Letters Patent of the United States is:

1. In a turbo-machine stator casing subject to appreciable bending stresses and extreme temperature gradients, the combination of a first unitary casing defining a fluid passage adapted to communicate with the rotor flow path and having a first continuous annular flange adjacent and concentric with the rotor, a second stator casing section divided into at least two portions along axial planes and secured together to form a continuous annular section, the second stator section having a second annular flange adapted to be secured to the first flange and a third annular flange at the opposite end of the section, a third stator casing section likewise divided into at least two portions along axial planes and secured together to form a continuous annular section and having a fourth annular flange at one end adapted to be secured to the third flange and a fifth annular flange at the opposite end of the third casing section, a fourth unitary casing section defining a fluid passage adapted to communicate with the rotor flow path and having a sixth continuous annular flange adapted to be secured to the fifth flange, said third and fourth flanges defining a cylindrical rabbet, a continuous annular ring member located between the third and fourth flanges and arranged in said rabbet, and means for securing the third and fourth flanges into firm engagement with the ring member whereby the mid-portion of the split stator casing is caused to preserve its true circular shape regardless of mechanical or thermal stresses.

2. A turbo-machine stator casing comprising a first cylindrical casing section divided along an axial plane into two halves secured together to form a continuous annular section with an annular flange at least at one end thereof, a second stator section adjacent and coaxial with the first section and divided into two halves along an axial plane and secured together to form a continuous annular section with an annular flange at the end thereof adjacent said first flange, said adjacent flanges defining a cylindrical rabbet, an integral metal ring member of a radial width substantially equal to that of the flanges and disposed between said flanges and fitting closely in said rabbet, and a plurality of circumferentially spaced bolt members disposed through the ring and flanges for securing the adjacent flanges in firm engagement with the ring member whereby the adjacent end portions of the split casing sections are held to true circular shape regardless of mechanical or thermal stresses during operation.

ALAN HOWARD.
BRUCE O. BUCKLAND.
CHESTER S. RICE.

References Cited in the file of this patent

UNITED STATES PATENTS

| Number | Name | Date |
| --- | --- | --- |
| 578,860 | Clark | Mar. 16, 1897 |
| 860,595 | Curtis | July 16, 1907 |
| 894,409 | Toms | July 28, 1908 |
| 905,973 | Zeitlin | Dec. 8, 1908 |
| 998,821 | Westinghouse | July 25, 1911 |
| 1,234,130 | Cartwright | July 24, 1917 |
| 1,654,605 | Rood | Jan. 3, 1928 |
| 1,666,626 | Losel | Apr. 17, 1928 |
| 1,812,034 | Brown | June 30, 1931 |
| 1,828,782 | Morton | Oct. 27, 1931 |
| 1,880,747 | Bowen | Oct. 4, 1932 |
| 1,938,688 | Brooke | Dec. 12, 1933 |
| 1,962,134 | Brubaker | June 12, 1934 |
| 2,125,751 | Sauliner | Aug. 2, 1938 |
| 2,144,706 | Pescara | Jan. 24, 1939 |
| 2,159,422 | Buchi | May 23, 1939 |
| 2,174,806 | Soderberg | Oct. 3, 1939 |
| 2,196,062 | Doran | Apr. 2, 1940 |
| 2,218,788 | Dahlstrand | Oct. 22, 1940 |
| 2,296,701 | Butler | Sept. 22, 1942 |
| 2,332,866 | Müller | Oct. 26, 1943 |
| 2,354,213 | Jendrassik | July 25, 1944 |
| 2,404,335 | Whittle | July 16, 1946 |
| 2,406,126 | Zweifel | Aug. 20, 1946 |
| 2,435,528 | Barlow | Feb. 3, 1948 |
| 2,443,054 | Putz | June 8, 1948 |
| 2,445,661 | Constant et al. | July 20, 1948 |